(No Model.)
T. S. ADKINS.
HAY STACKER.
No. 317,697. Patented May 12, 1885.
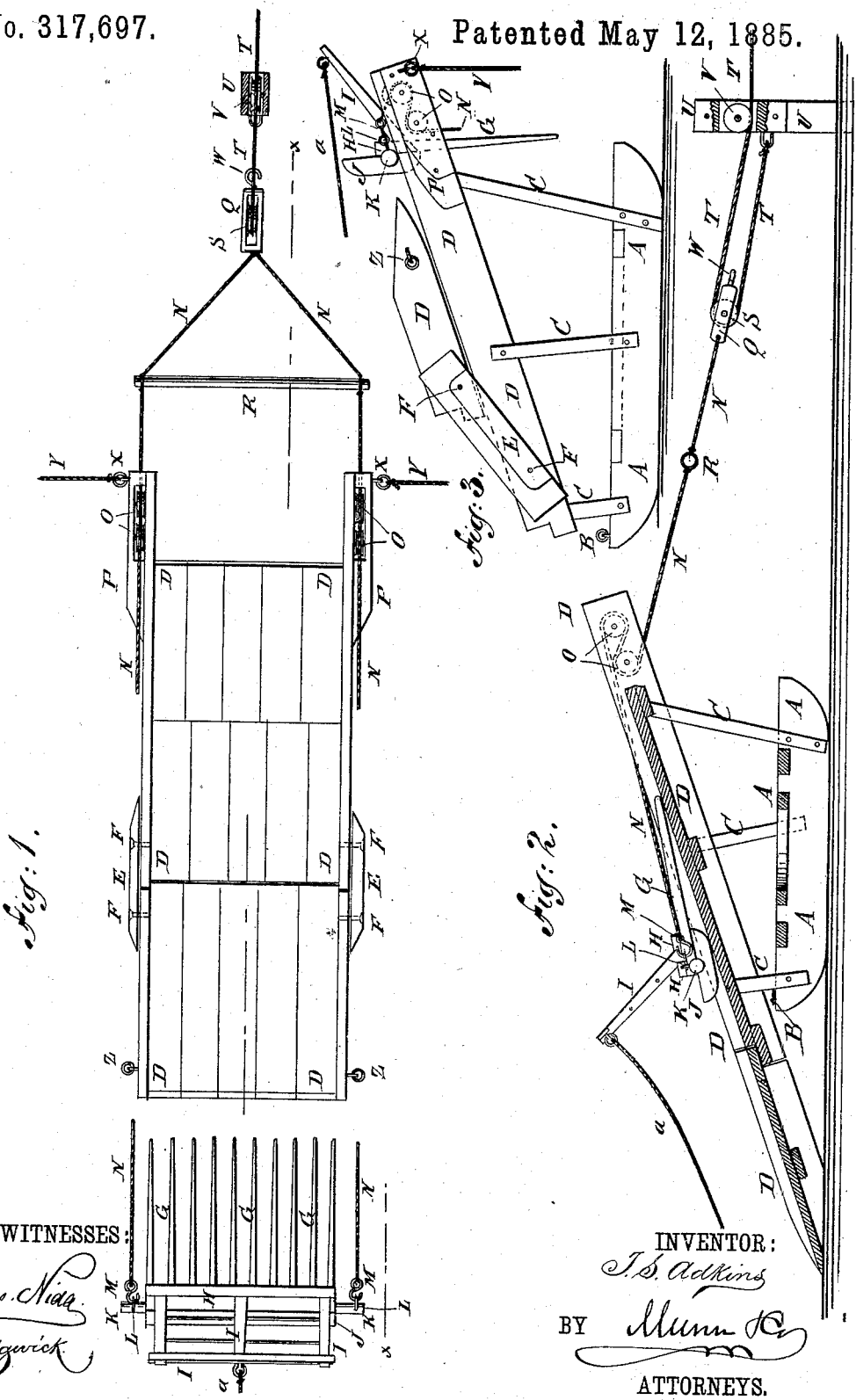
WITNESSES:
Chas. Nida
C. Sedgwick
INVENTOR:
T. S. Adkins
BY Munn & Co.
ATTORNEYS.

UNITED STATES PATENT OFFICE.

THOMAS S. ADKINS, OF FREDONIA, KANSAS.

HAY-STACKER.

SPECIFICATION forming part of Letters Patent No. 317,697, dated May 12, 1885.

Application filed January 29, 1885. (No model.)

*To all whom it may concern:*

Be it known that I, THOMAS S. ADKINS, of Fredonia, in the county of Wilson and State of Kansas, have invented a new and useful Improvement in Hay-Stackers, of which the following is a full, clear, and exact description.

Reference is to be had to the accompanying drawings, forming a part of this specification, in which similar letters of reference indicate corresponding parts in all the figures.

Figure 1 is a plan view of one of my improved hay-stackers, showing the rake ready to ascend the inclined platform. Fig. 2 is a sectional side elevation of the same, taken through the line $x\ x$, Fig. 1, but showing the rake part way up the inclined platform. Fig. 3 is a side elevation of the same folded for transportation, but showing the rake in position to discharge its load.

The invention consists of the combinations of parts and their construction, substantially as hereinafter fully set forth and claimed.

A is the base frame of the stacker, which is formed of two side-bars connected by cross-bars, and is made of such a length and breadth as to furnish a firm support to the said stacker. The lower sides of the ends of the side-bars in of the base-frame A are rounded, as shown in Figs. 2 and 3, so that the said base-frame will serve as a sled for moving the stacker from place to place. Rings or hooks B are attached to the ends of the side bars of the base-frame A for convenience in applying the draft.

To the side bars of the base-frame A are attached the lower ends of standards C, to the upper ends of which are attached the side bars of the frame of the platform D. The standards C are graduated in length, so that the said platform will have a suitable inclination and its upper end will have a suitable height, while its lower end rests upon the ground.

The frame of the platform D consists of side-bars connected by cross-bars, to which are attached the bottom boards of the said platform.

The platform D is made in two parts hinged together by bars E, pivoted to the side bars of the parts of the said platform by bolts F, or by other suitable hinges, so that the lower part of the platform can be turned or folded upon the upper part for convenience in transportation. The side bars of the platform D rise above the bottom boards, to serve as a track for the rake to move up and down upon. The rake-teeth G are attached at their rear ends to two cross-bars, H, to which is also attached an inclined frame, I, to serve as a back to prevent the hay from falling off behind while being carried up the platform D, and to serve as a handle in adjusting and guiding the rake.

To the end parts of the cross-bars H are attached shoes J, of such a size and in such positions as to rest upon the bottom boards of the platform D at the inner sides of the upwardly-projecting parts of the side bars of the platform-frame, to support the rake while moving up and down the platform, and to prevent the said rake from getting out of place laterally.

To the ends of the rake are attached arms K, which project over the upper edges of the side bars of the platform-frame, and to the outer ends of which are attached rings L to receive hooks M attached to the ends of the hoisting-ropes N. The ropes N pass up along the side bars of the platform-frame, and pass around pairs of pulleys O, pivoted to the projecting upper ends of the said side bars, and to blocks P, attached to the said ends. The upper ends of the ropes N are attached to a block Q and to the said ropes. At a little distance from their upper ends are attached the ends of a stretcher, R, of a length, equal to the width of the platform-frame, to cause the said ropes to draw squarely over the pulleys O.

To the block Q is pivoted a pulley, S, around which passes the draw-rope T. One end of the rope T is attached to a stake, U, set in the ground, and its other part passes over a pulley, V, pivoted in a slot in the said stake U, and to its end the draft-horse is designed to be attached. The stake U is designed to set in the ground in such a position that the pulley-block Q will come in contact with the said stake when the rake has reached the dumping position at the top of the platform D, so that the said stake will serve as a stop to prevent the said rake from being drawn up too far.

The draw-rope T and the stake and pulley U V need be used only with large stackers, where heavy rake loads are to be elevated.

With small-sized stackers the draft is applied to a hook, W, attached to the block Q or directly to the ends of the hoisting-ropes N.

To the upper corners of the platform-frame D are attached rings X, to which are secured the upper ends of guy-ropes Y, the lower ends of which are designed to be staked to the ground to steady the upper end of the platform D, and hold it from lateral movement. To the lower corners of the platform-frame are attached rings Z, to receive stakes to hold the lower end of the platform D from lateral movement.

To the back frame, I, of the rake is attached a hand rope, $a$, for convenience in turning the rake back upon the platform after it has been inclined to dump the load, so that it will slide down the said platform by its own weight.

In using the stacker, the rake is drawn through the field to collect a load, and is then drawn to the lower end of the platform D, when the horses are detached, and the hoisting-ropes N are attached to the arms K of the said rake. The horse, attached to the draw-rope T or the hoisting ropes N, is then started and the loaded rake is drawn up the platform D. As the loaded rake reaches the upper end of the platform D, it is dumped by the weight of its load, and the said load falls upon the stack. The rake is then turned back upon the platform by means of the hand-rope $a$, and slides down the said platform by its own weight, when it is detached from the ropes N, and moved to one side, and the stacker is ready for another loaded rake.

Having thus described my invention, I claim as new and desire to secure by Letters Patent—

1. A hay-stacker constructed substantially as herein shown and described, comprising the base-frame A, the standards C, the inclined platform D, made in two parts hinged together, the pulleys O, the rake G H, constructed with back frame, I, shoes J, and arms K, and the hoisting-ropes N, provided with a stretcher, R, whereby a loaded rake can be readily elevated and its load dumped upon a stack, as set forth.

2. In a hay-stacker, the combination, with the incline, the rake, and the hoisting-ropes N, of the pulley and block S Q, the draw-rope T, and the stake and pulley U V, substantially as herein shown and described.

THOMAS S. ADKINS.

Witnesses:
ULYSSES S. JONES,
JANE ADKINS.